United States Patent
Cross et al.

[11] Patent Number: 6,069,800
[45] Date of Patent: May 30, 2000

[54] LINE HARMONIC CORRECTING FLYBACK POWER CONVERTER

[75] Inventors: David A. Cross, Sandy Beds, United Kingdom; Neal George Stewart, Tsuen Wan, The Hong Kong Special Administrative Region of the People's Republic of China

[73] Assignee: Astec International Limited, Hong Kong

[21] Appl. No.: 09/126,798

[22] Filed: Jul. 31, 1998

[51] Int. Cl.[7] .................................................. H02M 3/335
[52] U.S. Cl. ................... 363/20; 363/37; 363/40
[58] Field of Search .................. 363/20, 21, 34, 363/37, 39, 40, 127

[56] References Cited

U.S. PATENT DOCUMENTS

| | | | |
|---|---|---|---|
| 3,889,173 | 6/1975 | Klusmann et al. | 363/21 |
| 4,930,060 | 5/1990 | Leonardi | 363/21 |
| 5,349,516 | 9/1994 | Megeid | 363/21 |
| 5,377,091 | 12/1994 | Faulk | 363/21 |
| 5,402,330 | 3/1995 | Megeid | 363/21 |
| 5,424,932 | 6/1995 | Inou et al. | 363/127 |
| 5,581,453 | 12/1996 | Ueta et al. | 363/21 |
| 5,745,358 | 4/1998 | Faulk | 363/21 |
| 5,852,550 | 12/1998 | Majid et al. | 363/21 |
| 5,909,361 | 6/1999 | Kim | 363/21 |
| 5,909,363 | 6/1999 | Yoon | 363/21 |

OTHER PUBLICATIONS

"Advanced Power Conversion Based on the Aerocapacitor," Power Conversion Electronics, Sep. 1995 Proceedings, 249, Louis C. Josephs, Dennis Gregory, Dennis Roark, Mark J. Isaacson, Jim Kaschmitter, Steve Mayer and Rick Pekala.

Primary Examiner—Jeffrey Sterrett
Attorney, Agent, or Firm—Coudert Brothers

[57] ABSTRACT

Effective harmonic correction without frequency, power or voltage limitations is achieved in a single-stage DC-to-DC converter by disconnecting the bulk capacitor of a typical single-stage converter during low voltage conditions, and by using various phase and cycle modulation techniques associated with a switchable auxiliary transformer winding which charges the bulk capacitor to control its voltage. A means is thus provided to control the level of harmonics generated depending upon the level of the AC output voltage. When the auxiliary winding is used as a clamp winding, full ZVS conditions are provided for both the auxiliary winding switch and the converter's primary winding switch. Energy can then also be directed, under independent control of the switched auxiliary winding, to independent power nodes, i.e., either the output capacitance and load, or the bulk capacitor. This ensures that the output voltage will not be affected during any period needed to recharge the bulk capacitor.

16 Claims, 9 Drawing Sheets

LINE HARMONIC CORRECTING FLYBACK POWER CONVERTER

FIELD OF THE INVENTION

This invention relates to a single-stage DC-to-DC flyback power converter using both non isolating pre-regulation embodiments and isolating topologies, and more specifically to a power factor or harmonic correction system using auxiliary winding disconnect or clamp switch techniques.

BACKGROUND OF THE INVENTION

DC-to-DC isolating converters or interleaved converters fed from a rectified AC source typically operate over a large input voltage range and require harmonic input current correction. Effective harmonic correction of a rectified AC supply results in a large amount of ripple current in the secondary circuits of the isolation transformer or such isolating converters. Keeping the output of the converter within acceptable ripple limits has previously required very substantial amounts of storage capacitance. The physical bulk of capacitors satisfying that requirement has heretofore mitigated against the use of effective harmonic correction techniques, particularly in miniaturized and very low output voltage converters.

Known techniques for allowing effective harmonic correction without excessive ripple have included the use of two independent conversion stages, a power factor correcting stage depositing energy on an intermediate high voltage capacitor, or the use of a single stage performing both power factor correction and DC-to-DC conversion. The latter is, however, limited to variable frequency operation or operation only in discontinuous converter states. These operational modes provide efficient operation only for low output power levels.

SUMMARY OF THE INVENTION

The present invention provides a single-stage DC-to-DC flyback power converter that allows effective harmonic or power factor correction without imposing frequency, power or voltage limitations on the converter. The invention achieves this by providing an auxiliary winding on the isolation transformer that can either be cyclically disconnected, or used with a clamp switch to charge the hold-up or bulk capacitor. Typically, the auxiliary winding charges the bulk capacitor, but is switched off whenever the input voltage drops below the bulk capacitor voltage.

The level of harmonic control, i.e. the voltage on the bulk capacitor, can be changed, in accordance with the invention, by changing the RMS input voltage independently of the ratio of the auxiliary winding to the output winding.

DETAILED DESCRIPTION OF THE INVENTION

Figure 1:
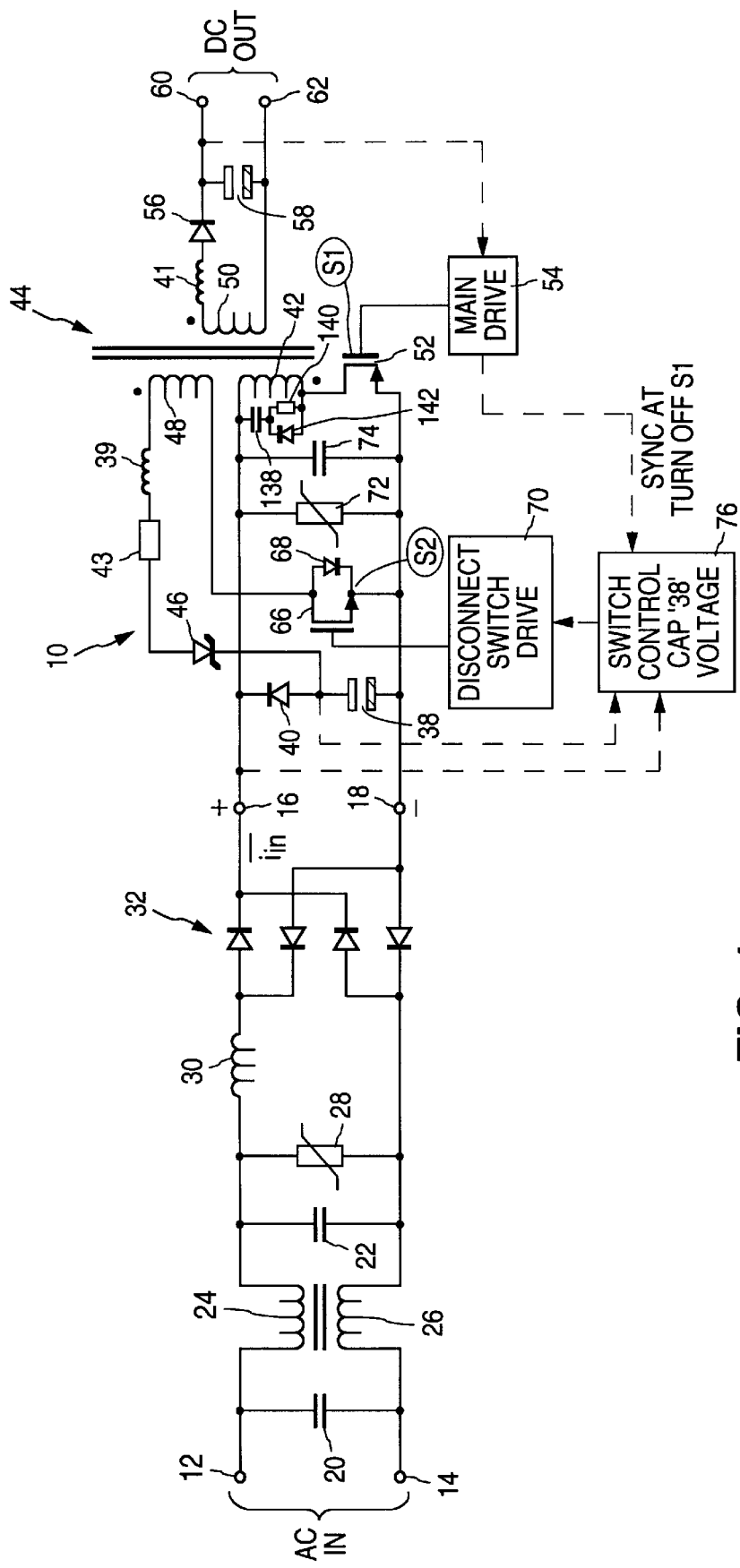
FIG. 1 is a circuit diagram of a flyback converter using a disconnect switch for harmonic control.

FIG. 1 illustrates a power converter constructed in accordance with the present invention. Such a converter may be used, for example, to convert an AC input of 240 V p-p into a 15 V DC output. AC input power is applied to the circuit 10 at terminals 12, 14 and is conventionally used to produce a DC input at terminals 16, 18 through a network including capacitors 20, 22, common-core inductors 24, 26, transient-absorbing voltage-dependent resistor (VDR) 28 and an inductance 30, and through a full-wave rectifier 32. The DC input at terminals 16, 18 may range in voltage from about 85 V RMS to 265 V RMS and has the shape of curve 67 in FIG. 2. The input current drawn by the circuit 10 through terminals 16, 18 is illustrated by curve 69 (for constant output power) or 85 (for sinusoidal power) in FIG. 2 and will be seen to be fundamentally in phase with the input voltage.

An electrolytic or similar storage capacitor 38 is connected across the terminals 16, 18 in series with a diode 40 to act as a shunt-charged low voltage storage capacitor. The capacitor 38 can be rated lower in voltage, and higher in capacitance, than conventional bulk capacitors commonly used in parallel with the primary winding 42 of the isolation transformer 44 in circuits of this type. This is because diode 40 is normally back-biased and draws current from capacitor 38 only when the input voltage is less than the capacitor voltage (e.g. about 100 V).

The reduced voltage rating and higher capacitance of capacitor 38 results in significantly lower losses because of lower RMS losses in the rectifier 32, the filter 22, 30, and the capacitor 38 itself which is only used to store a significantly lower proportion of the converter's energy than a conventional bulk capacitor stores (e.g. less than 40%).

The energy to recharge the capacitor 38 during each cycle of the DC input is provided by winding 48, which produces a ratio of the output voltage of the secondary winding 50 of isolation transformer 44. Resistor 43 may be added to limit the recharging current for capacitor 38. The winding 48 acts as a clamp for capacitor 38 and takes leakage energy into capacitor 38 so as to reduce snubbing losses in the transformer primary 42. Because capacitor 38 is essentially slaved to the output, any change in secondary voltage will also result in a change of the voltage on capacitor 38. Capacitor 38 thus becomes a part of the dynamics of the circuit 10 and clamps any overswing voltages in the output of circuit 10 that occur with leaky transformers. Leakage inductances in the primary and secondary circuits are represented in FIG. 1 by 39 and 41, respectively.

The leakage inductances, depicted as 39 in series with the winding 48 and 41 in series with the secondary winding 50, will require a higher voltage on the clamp capacitance, effectively the source of power during the clamp cycle, to satisfy the output voltage requirements. This characteristic is particularly apparent when a larger than normal leakage inductance is required to ensure ZVS action (see FIGS. 6, 7, 9 and 10) for lower power converter operation, where this converter use is directed.

The end result of the above is that operation without the clamp being operated, after a supply voltage drop out where the bulk capacitor 38 can lose 10% of its voltage, will not be limited by the voltage on capacitor 38. Power can be directed to the output load under these conditions without the clamp operating. Thus, operation in conjunction with the clamp modulation control can both recharge the capacitor 38 and sustain power to the output nodes as necessary. Thus when the clamp is operating with a low voltage on capacitor 38, power will be directed to the bulk capacitor 38 via diode 46 rather than the output circuit diode 56 and capacitor 58.

The circuits referred to in FIGS. 6, 7, 9 and 10 operate with superior efficiency over the whole AC voltage range because the circuit techniques reduce the predominant RMS current losses at low AC voltages and reduce the predominant capacitor-voltage-squared losses at high AC voltages. Also, all the circuits produce a higher power factor than conventional single-stage circuits, thereby reducing the level of harmonic currents drawn by the power supply from the input.

The primary winding 42 is conventionally switched on and off at high frequency (e.g. 100 kHz) by a MOSFET switch 52 driven by a conventional pulse width modulated oscillator 54. This induces a high frequency low voltage in secondary winding 50 as well as a similar but higher voltage in winding 48. The output of secondary winding 50 is rectified by diode 56 and a filter circuit using capacitor 58 to produce the rated DC output at terminals 60, 62. A VDR 72 and a small capacitor 74 are also connected in parallel across terminals 16, 18.

In accordance with one aspect of the invention, capacitor 58 may be an EDLC for applications using a full power factor input or sinusoidal power input. This type of capacitor has a high surface area, high density, well controlled pore diameter and high material conductivity. Its frequency response is comparable to that of aluminum electrolytic capacitors but with much smaller dimensions. Its use, in conjunction with a normal low ESR capacitor, either using aluminum or ceramic capacitors, to reduce its effective inductance, thus permits capacitances not otherwise practical in miniaturized circuits, thereby allowing large energy storage. In the circuit of the invention, it permits absorption of a major portion of the variations in secondary side low frequency line harmonic currents. Its principal advantage in the circuit 10, particularly for low voltage outputs, 1.0 V to 2.5 V, is to hold up the supply during the recharge of capacitor 38 so that no change in voltage is seen at the output 60, 62 during that time.

Figure 2:
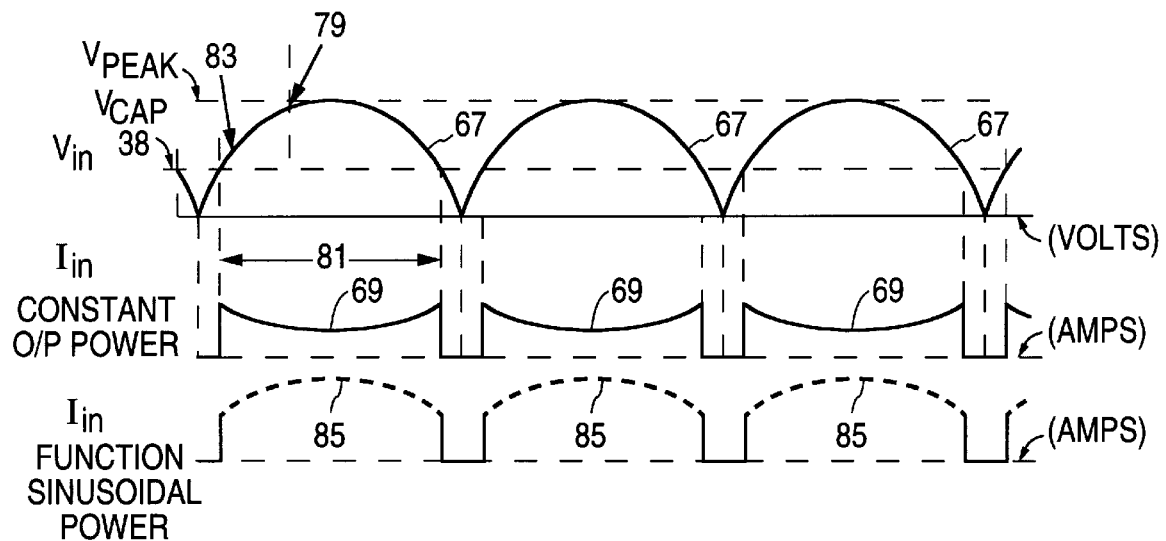
FIG. 2 is a time-amplitude diagram showing the correlation of DC input voltage and input currents for the circuits of FIGS. 1, 3, 4, 6, 7, 9, 10 and 12.

In accordance with the invention, in FIG. 1, the clamp winding 48, which charges the bulk capacitor 38, is disconnected by the disconnect drive 70 which controls the disconnect switch 66 whenever the input voltage at terminals 16, 18 drops below the voltage $V_{min}$ stored on capacitor 38 (see FIG. 2). This occurs, of course, at twice the line frequency. During that condition, current for the primary winding 42 is provided by the bulk capacitor 38 through the diode 40.

The disconnect switch drive 70 is operated in accordance with the switch control voltage 76 from capacitor 38.

In the operation of circuit 10, the capacitor 38 of the harmonic correction system is disconnected from the auxiliary winding 48, which keeps it charged, whenever the input voltage at terminals 16, 18 falls below the voltage stored on capacitor 38. In circuit 10, this is achieved by periodically turning the switch 66 off at the line frequency. The advantage of using the switch 66 is that it prevents a drop in the voltage across capacitor 38, either during the period of conduction of diode 40 at low AC input or during a momentary AC input dropout, from affecting the output voltage. The inventive arrangement minimizes the voltage drop that would be seen on the output due to the clamping action of the auxiliary winding 48 when diode 46 is allowed to conduct into capacitor 38. With the switch 66 connected as shown in FIG. 1 (i.e. with the MOSFET switch's internal diode 68 pointing down), the winding 48 is completely disconnected from the capacitor 38 when the switch 66 is off. If, however, the connections of switch 66 are reversed so that its internal diode points up in FIG. 1, the winding 48 is always so connected to the capacitor 38 so as to clamp capacitor 38 and provide zero voltage switching when the switch 66 is operated at the same frequency as switch 52.

Another advantage of the circuit 10 is that it allows an exact choice of the time in the input wave at which switch 66 turns on. There is a period 81 in the cycle of FIG. 2 where the capacitor 38 is being recharged by winding 48. This normally causes a disturbance at the output of the converter. If the switch 66 is closed at or near the crest of the input curve (curve 79 as opposed to curve 83), there will be a higher power gain in the system which will result in capacitor 38 being recharged in a shorter period, thereby reducing the duration of this disturbance.

In the circuit 10, the number of turns of winding 48 may be the same as that of primary winding 42 (this would allow bifilar winding of windings 48 and 42), or it may be lower to allow switch 66 to have a lower voltage rating.

Figure 3:
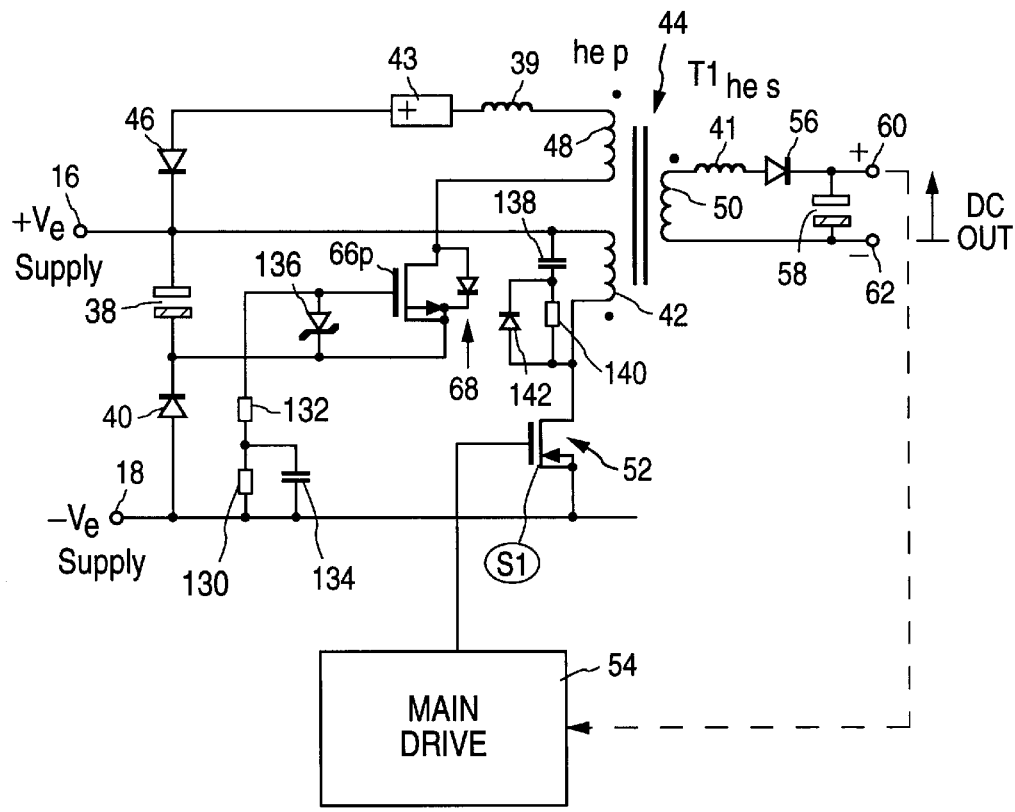
FIG. 3 is a partial circuit diagram of the converter of FIG. 1 modified as a simple P-channel low voltage harmonic switch.
Figure 4:
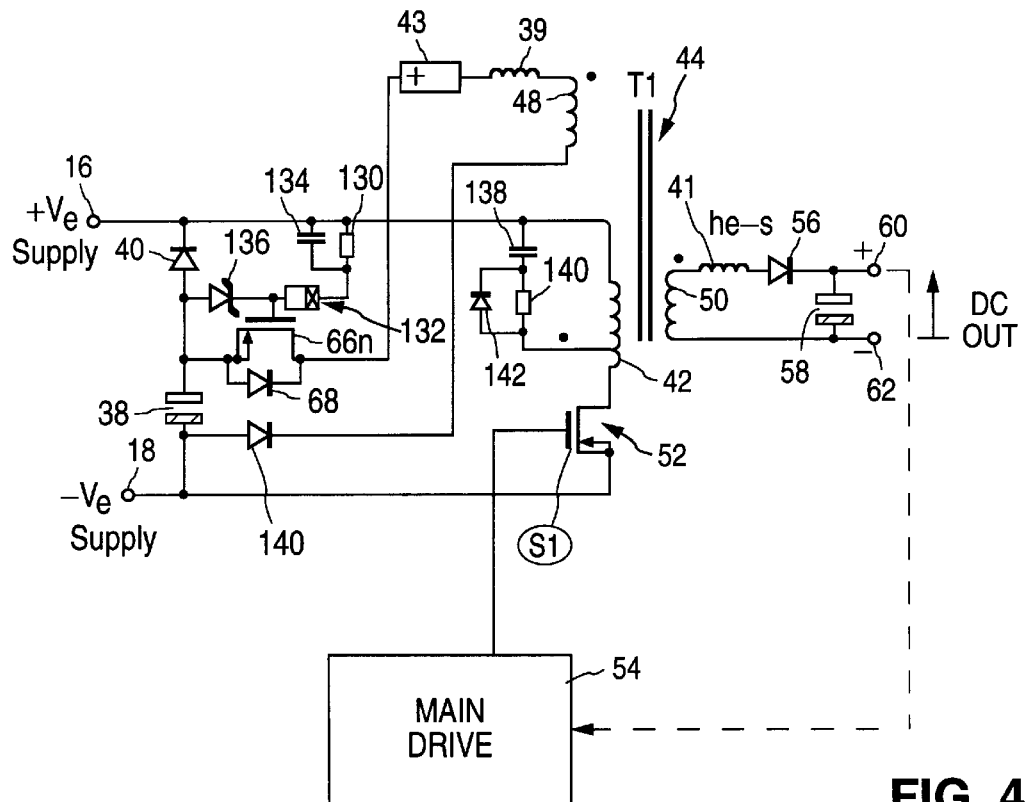
FIG. 4 is a diagram similar to FIG. 3 but using a N-channel device.

FIGS. 3 and 4 show preferred circuits for P-channel and N-channel disconnect switches, respectively, which dispense with the need for a separate disconnect switch drive logic and drive the disconnect switch directly from the conventional main drive logic.

In FIG. 3, it will be seen that the bulk capacitor 38 is connected to the positive supply 16, and through a 400 V diode 40 to the negative supply 18. Resistors 130 and 132 (the former bridged by capacitor 134) in conjunction with a 15 V zener diode 136 provide the gate feed for disconnect switch 66p. A network consisting of capacitor 138, resistor 140 and diode 142 is provided across the primary winding 42 as an end stop snubber. This snubber arrangement significantly reduces the average voltage stress because the connection to the bulk capacitor 38 through winding 48 puts leakage energy into the bulk capacitor 38. Optionally, a resistor 43 may be used to limit charging current.

The MOSFET 66p in this circuit may be a 100 V 0.6W or 200 V 1.5W D-type device; resistor 130 may be a 470K ¼W resistor shunted with a 1 nF capacitor 134; resistor 132 may be 10K; diode 46 may be a 400–600 V 1A fast recovery diode; diode 40 may be a 600 V 2A peak normal recovery diode; capacitor 38 may be 2,200 μF at 60 with 72 V surge, for 10 ms hold up when dropping from 60 V to 55 V; and the winding ratio of transformer 44 may be 18 turns for winding 48 to 9 turns for winding 42 and 2 turns for secondary winding 50. The main switch 52 may be either a FET or an IGBT equivalent to 0.4 ohm at 150° C.

With these parameters, the disconnect switch 66*p* will be automatically turned off when the DC supply 16, 18 drops below the voltage on capacitor 38, e.g. at 60 V. However, this will only occur with low voltage switching across the P-channel FET, as the DC input 16, 18 will be much less than 100 V when this occurs. This dispenses with the disconnect switch drive 70 and reduces the required rating of the P-channel FET to about 100 V.

FIG. 4 illustrates the same concept but applied to an N-channel device 66*n*. The FET 66*n* is driven on when the DC supply 16, 18 is greater than 60 V and is disconnected automatically when it is below that value, by the same components as described above.

Figure 5:
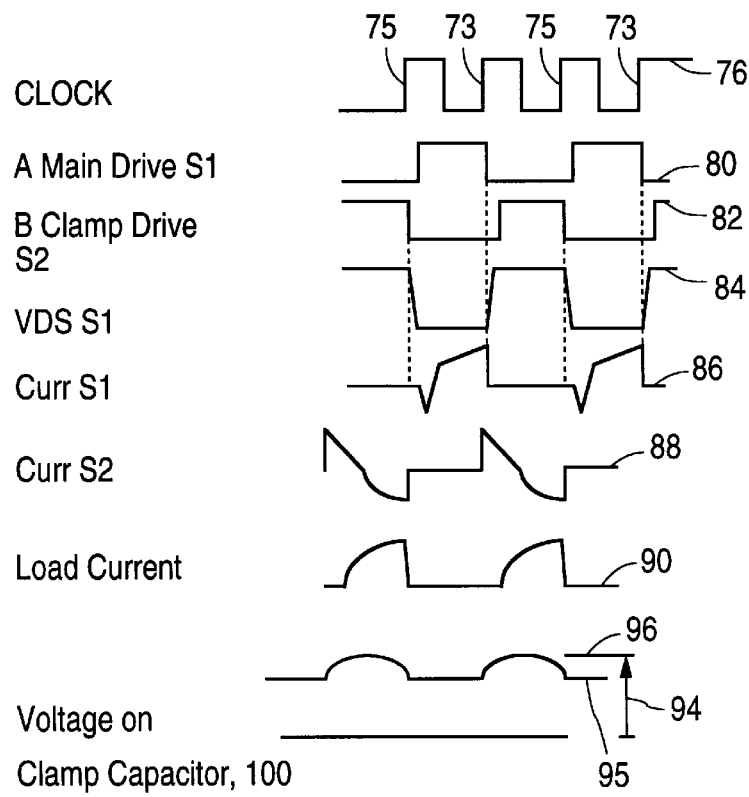
FIG. 5 is a set of time-amplitude diagrams illustrating the relation of various parameters in the circuits of FIGS. 6, 7, 9 and 10.

FIG. 5 illustrates the time relationship and waveforms of various elements of the circuits 6, 7, 9 and 10. Curve 80 shows the output of main drive 54, and curve 82 shows the output of clamp drive 70*a*. Curves 84, 86, 88 and 90 show the resulting waveshapes of, respectively, the voltage across main switch 52, the current through main switch 52, the current through the auxiliary winding clamp switch 66, and the current output of the load circuit composed of secondary winding 50 and output diode 56. As will be seen in FIG. 5, the auxiliary winding clamp switch 66, when operated at high frequency, and the main switch 52 use the same time reference or clock 76. Consequently, no magnetic interface is needed for the auxiliary winding clamp drive 70*a*. Alternate rising edges of the clock 76 in the main drive 54 are used to synchronize the falling edge of the main drive 54 (edges 73) and the falling edge of the auxiliary winding clamp drive 70*a*(edges 75). The duty cycle of the high-frequency pulses is separately adjustable for the main drive 54 and the auxiliary winding clamp drive 70*a*for zero voltage switching. Also, there are no startup surges in the transformer primary circuit because capacitor 38 is charged by the DC-to-DC conversion circuitry, not by the input supply at terminals 16, 18. Thus, the circuits 6, 7, 9 and 10 operate efficiently through both continuous and discontinuous load regions of the auxiliary winding clamp flyback cycle and over a wide input range. The voltage seen on the Clamp capacitor 100, is shown as waveform 95. Waveform 96 shows the large ripple voltage as compared to the DC voltage, 94, which represents the voltage seen on the hold up capacitor 38. See FIG. 6 and FIG. 7, FIG. 9 and FIG. 10.

It should be noted that the Schottky diode 46, and the clamp capacitor 100 are needed to show the above ripple voltage which allows independent control of the capacitor voltage, C38, as against the existing control of the output voltage.

Figure 6:
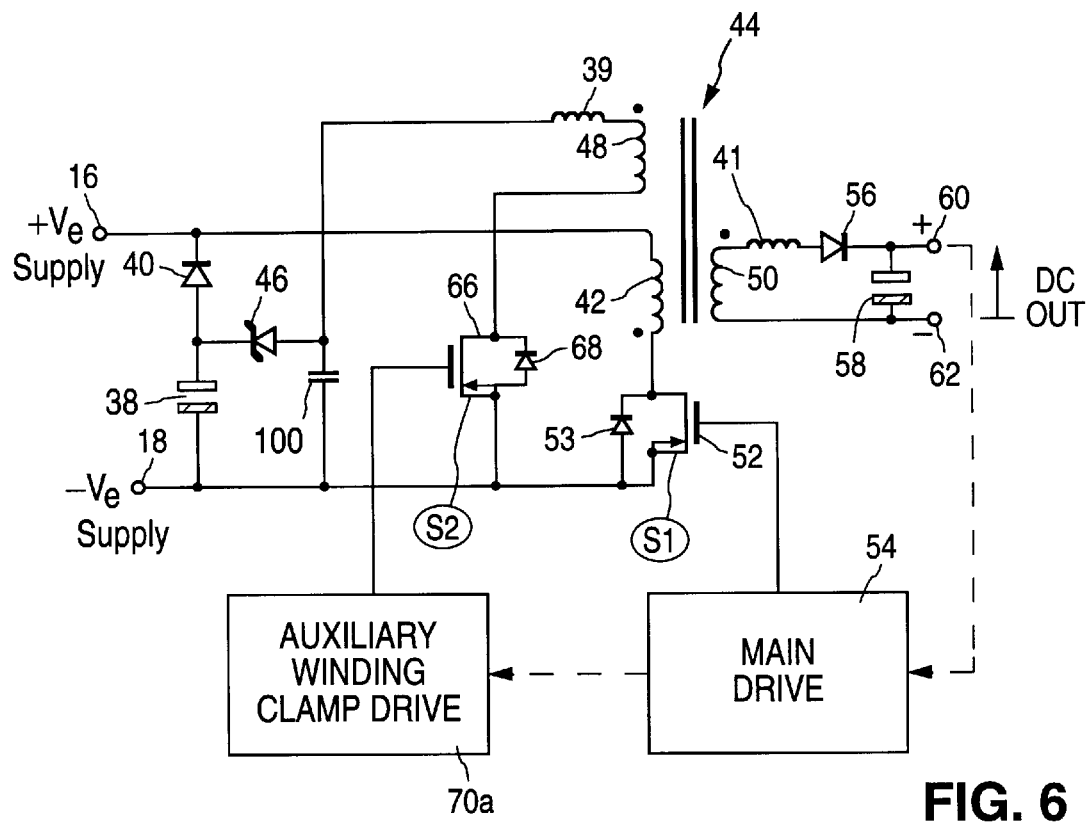
FIG. 6 is a partial circuit diagram of a converter using a preferred auxiliary clamp drive arrangement which provides additional ZVS features for both switches.
Figure 7:
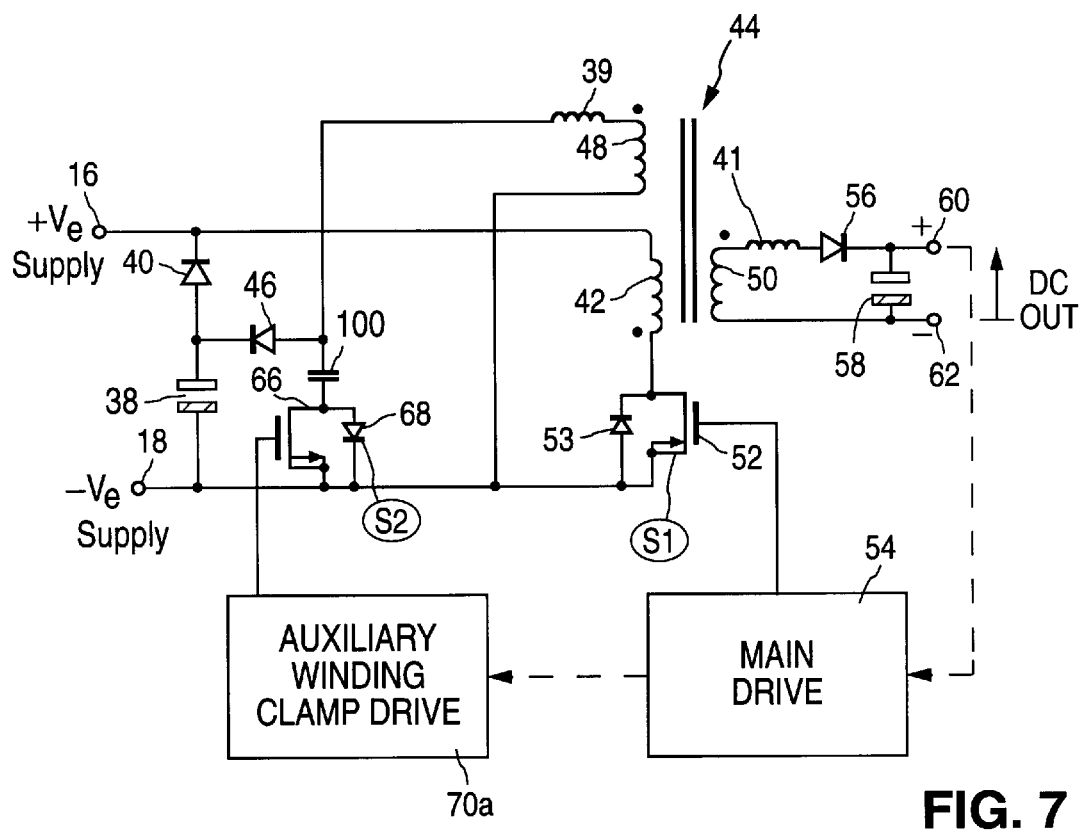
FIG. 7 is a circuit diagram similar to FIG. 6 but showing an alternative auxiliary clamp drive arrangement.

FIG. 6 shows a preferred, and FIG. 7 an alternative, auxiliary clamp drive arrangement in which the clamp switch 66 is driven directly from the main drive 54 through an auxiliary winding clamp drive 70*a*for zero voltage switching.

Figure 8:
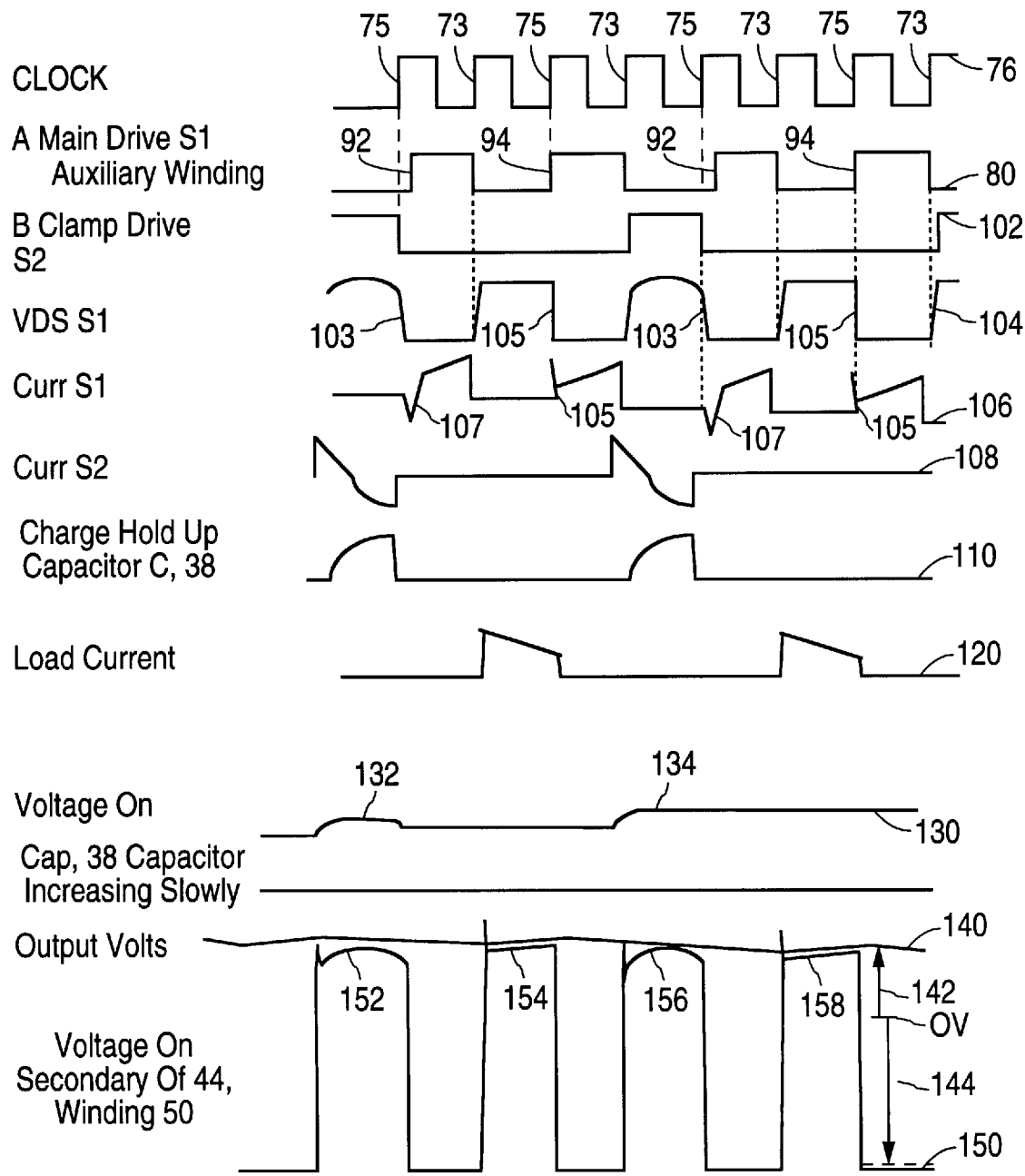
FIG. 8 is a set of time-amplitude diagrams showing the modulation of the auxiliary clamp drive to provide a variation of the bulk capacitor 38 voltage.
Figure 9:
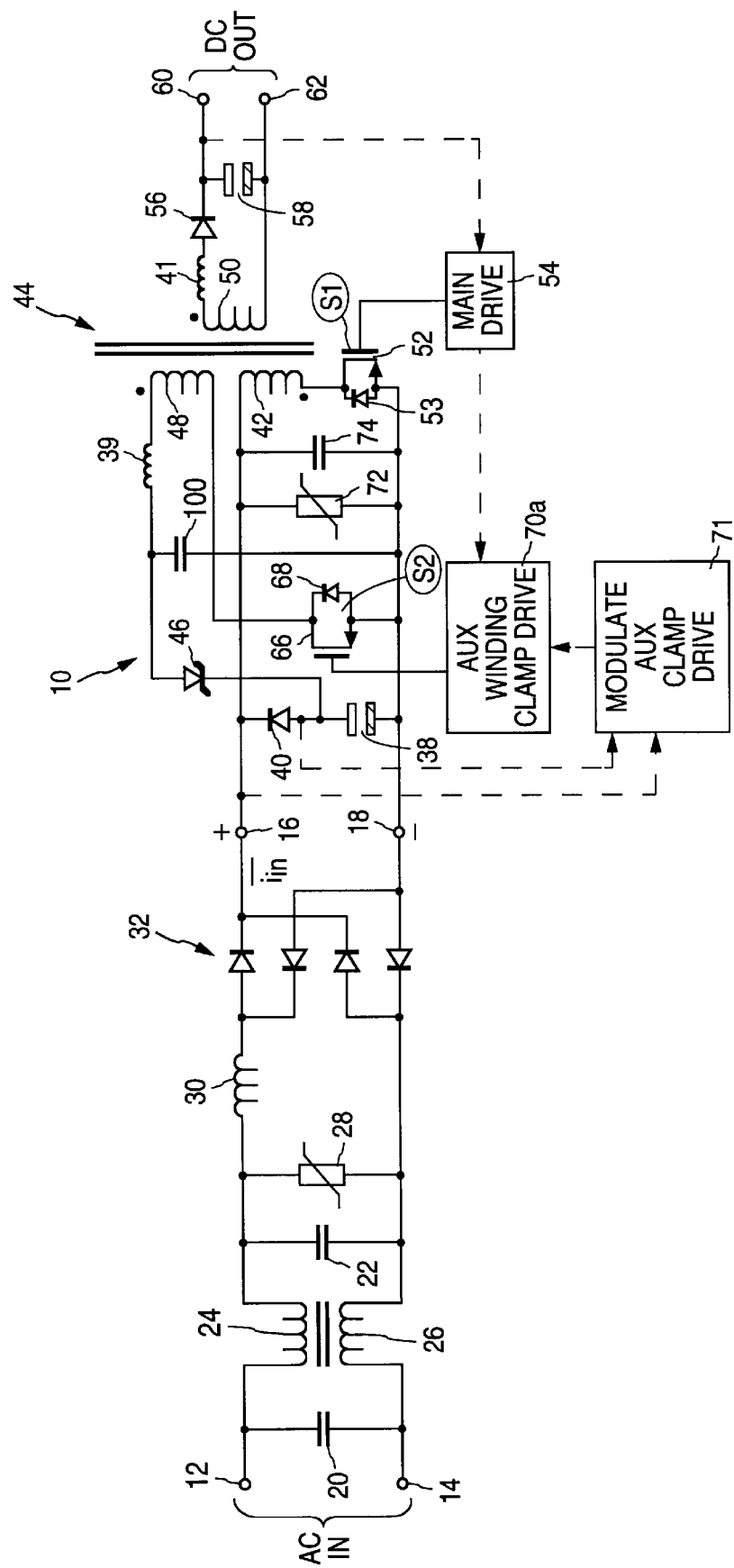
FIG. 9 is a circuit diagram of a ZVS flyback converter using an auxiliary clamp drive for harmonic control.

FIG. 8 illustrates the timing relationships for a modulated auxiliary winding clamp drive 70*a*as depicted in FIGS. 6, 7, 9 and 10. In the arrangement of FIGS. 8 and the related circuits, the auxiliary winding clamp drive to S2 is applied on every other cycle as shown in waveform 102. The currents in S1 change from a ZVS condition, 107, to a non ZVS condition, 105. The voltage on capacitor 38, waveform 130 is shown to increase during the condition where the clamp is turned on 132 and 134. Waveform 150 shows the relationship of the output voltage across the transformer winding 50, see 152 to 158 as compared to the output voltage 140. The relationship between the output voltage 140 changes as the voltage on the hold up capacitor 38 increases, note that waveform 156 is much nearer to 140 as compared to 152. This will eventually mean that all the energy, excluding leakage, will flow into the secondary. The voltage on the auxiliary clamp winding when continuously operated for obtaining ZVS conditions will be consistently higher than the output voltage, and thus will not divert energy from the output. Conversely, when the input voltage is low, the voltage can drop on the hold up capacitor 38 without loading the output as the switch S2 would be continuously turned off during this period.

Figure 10:
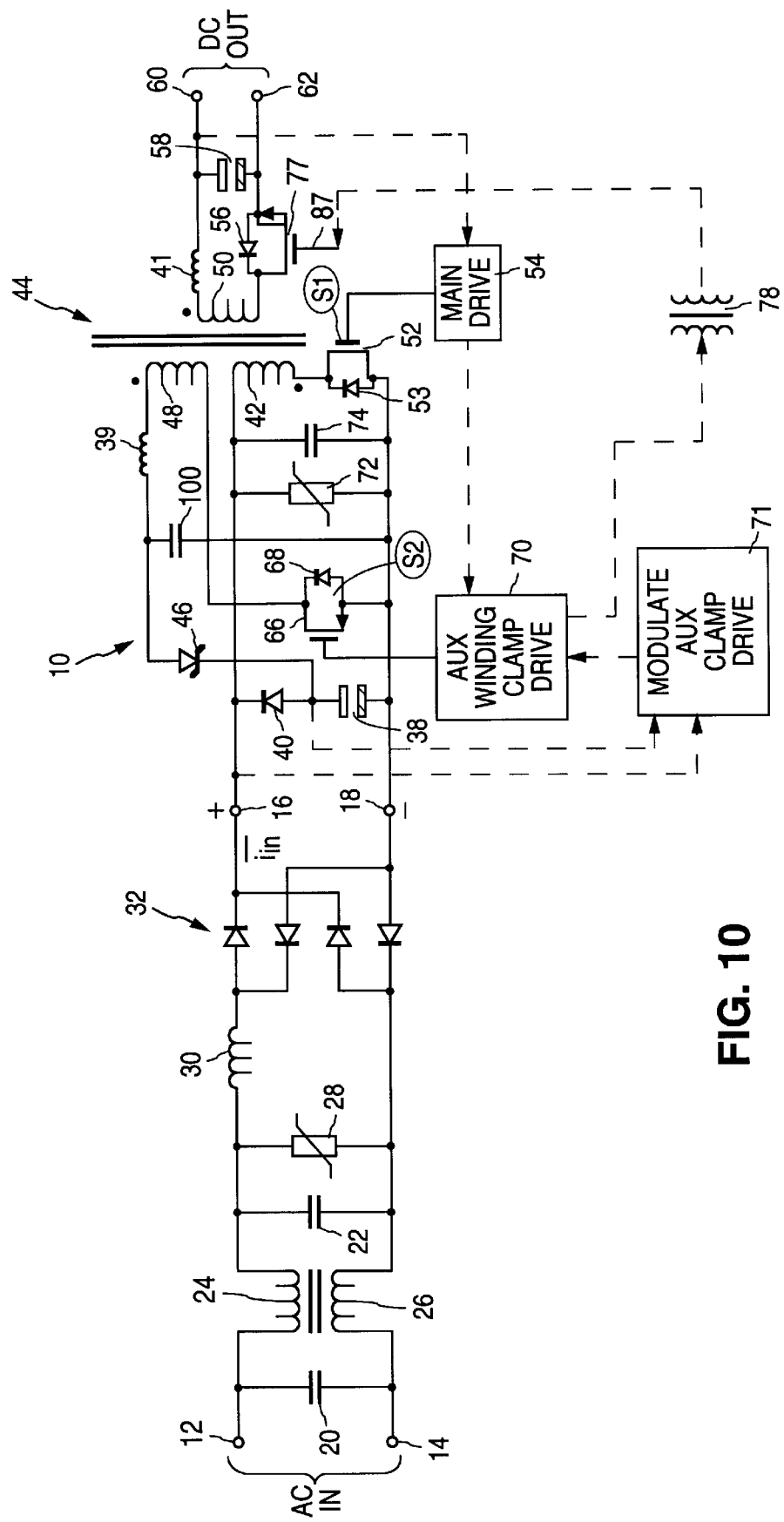
FIG. 10 is a circuit diagram similar to FIG. 9 but also using a synchronous rectifier driven in phase with the auxiliary clamp.

FIG. 10 depicts an auxiliary clamp drive which drives not only the switch 66, but also a synchronous rectifier 87 through an isolation transformer 78 in the same time sequence.

Figure 11:
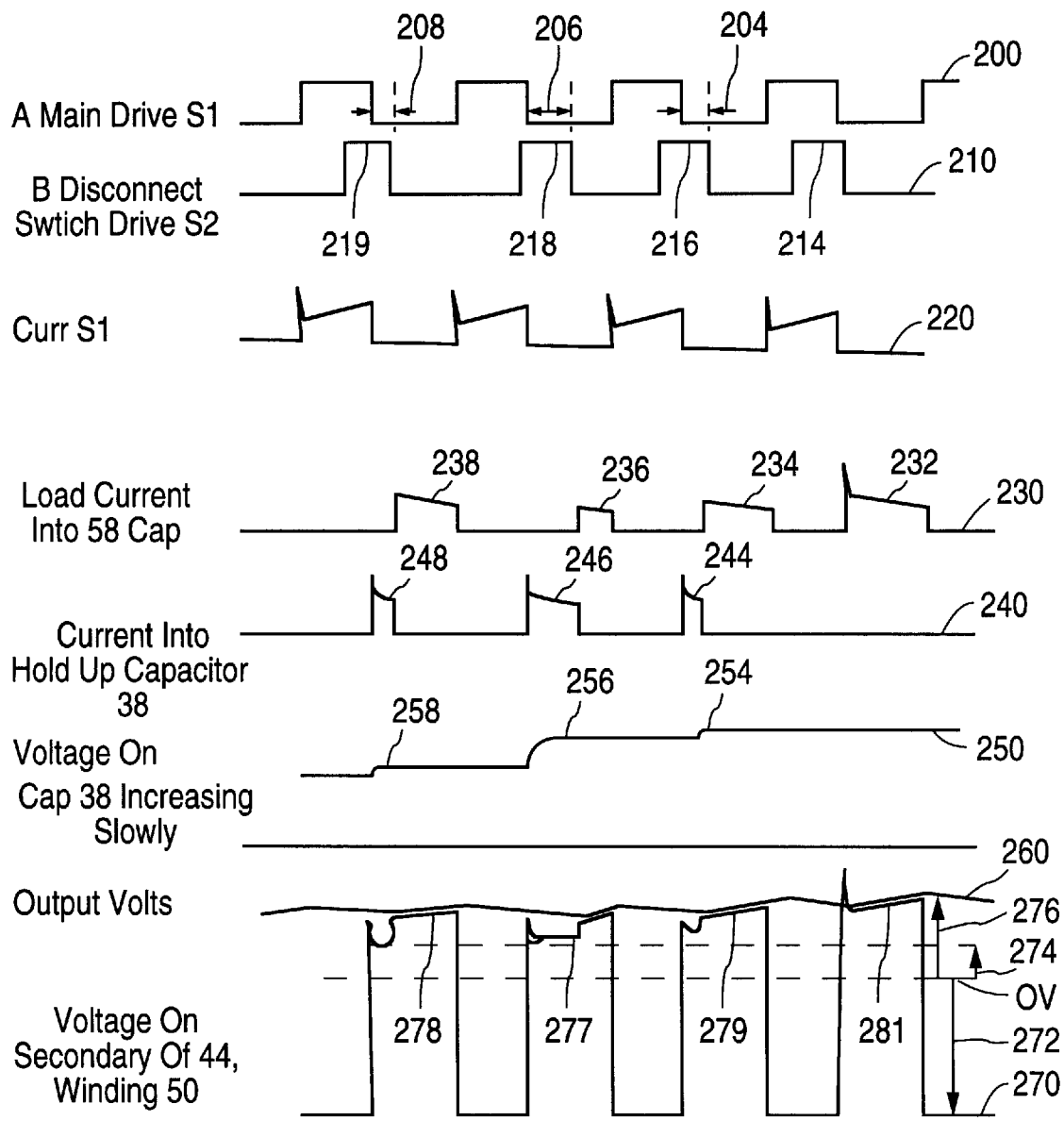
FIG. 11 is a time-amplitude diagram showing a phased pulse switch drive for a disconnect switch for independent control of the bulk capacitor voltage.
Figure 12:
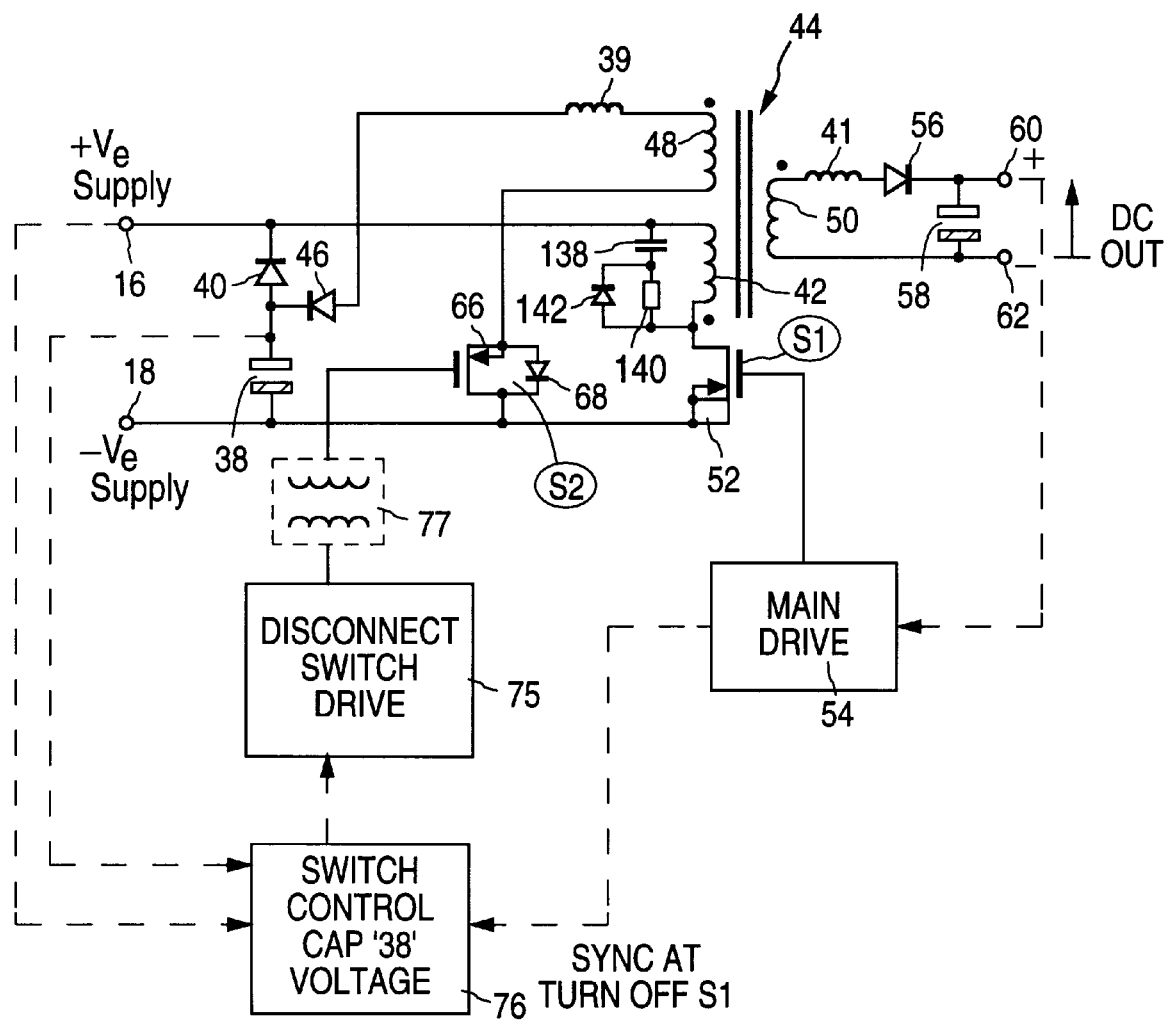
FIG. 12 is a partial circuit diagram of a flyback converter using a transformer-coupled phased pulse switch drive with an N-channel disconnect switch.

FIGS. 11 and 12 illustrate a transformer-coupled phased pulse switch drive which allows an independent control of the voltage on the bulk or hold-up capacitor 38.

A major feature of the invention is that the level of harmonic control, i.e. the level of voltage on the hold up capacitor 38, can be changed as needed by the level of RMS input voltage independently of the ratio of the auxiliary winding and the output winding.

There are three ways of providing the variation of the voltage on capacitor 38:

1) Disconnect Switch (FIG. 1).

This circuit disconnects the switch 66 when the requisite voltage to ensure the correct harmonic or power factor level has been achieved on 38. This of course will leave the main switch 52 without any connection of the leakage energy in transformer 44 at turn off. This leakage energy is put, via diode 142, into snubber capacitance 138 which is slowly discharged via resistor 140. As can be seen there is no connection between the main drive and the disconnect switch drive; switch 52 is driven in the normal PWM manner without any need for any special timing arrangements, and of course cannot provide for any ZVS improvement in efficiency.

Whatever harmonic voltage is chosen for capacitor 38 will of course need the energy to be replenished in the capacitor after the hold up period has finished, whereas during the initial start up period the voltage on the capacitor 38 will limit the voltage on the output until the switch is disconnected. However, outside the start up period, the use of the switch in order to charge the capacitor 38 has to be limited or modulated so that continuous energy is not diverted to charging capacitor 38 without leaving any for the output capacitor 56.

This may be done by modulation or by using a limiting component 43, possibly a resistor or large inductor dependent upon energy levels, which still allows some energy to be diverted to the output 60 during the period when replenishing energy is fed into capacitor 38. The components 43 have also been introduced into FIG. 3 and FIG. 4, the simple P and N channel harmonic switch arrangements previously described.

2) Modulation Scheme.

Essentially, as shown in FIG. 5, there is a large amount of ripple voltage seen on the clamp capacitor 96. This can be designed to be as much as 50%, as compared to the DC level 94 (see FIG. 5). The circuit that this refers to, i.e. the clamp capacitor 100, is shown in FIG. 6 and FIG. 7. It should be noted that the alternative arrangement of FIG. 7 would require a P channel switch for 66 clamp switch and could not use a Schottky device for diode 46. It should also be noted that the use of 38 as the clamp capacitor, i.e. without diode 46, would not allow any ripple voltage on the clamp capacitor.

FIG. 8 illustrates the effect of closing the clamp drive on alternate cycles so that energy flows to the output voltage on one cycle and to capacitor 38 on the other cycle. Variations of this relationship can occur, one cycle in every two or three, two cycles in four, three cycles in six, etc., and also that the switch could be closed for part of the cycle, not the total part of the cycle, for instance, to limit any disturbance on the output. As this modulation occurs at high frequency the amount of storage energy needed in the output capacitor 58 would not be excessive.

The use of the auxiliary winding clamp drive would of course have the most benefit for providing ZVS efficiency benefits for high input voltages whereas the design would not allow ZVS activity at the low line input voltages. If a variable voltage on capacitor 38 dependent on input voltage was to be adopted, e.g. say 60 to 80 VDC for low line 115 VRMS nominal and say 170 V to 190 VDC for high line operation at 230 VRMS 208 VRMS two-phase operation, the auxiliary winding clamp drive would not be used for low line operation but full ZVS benefit could still be obtained for high line.

3) Phased Pulse Disconnection Switch Drive.

The disconnect switch shown in FIG. 1 could also adopt another modulation scheme to solve the same problem. The disconnect drive could be closed at high frequency for part of the turn off cycle, when switch 52 is off, for every two cycles or three cycles etc. until the requisite voltage on the hold up capacitor 3 8 is achieved. In this case there would be a connection between main drive 54 switch control voltage and 76 to provide the correct signal synchronization, but there would now be no need for an energy limiting component 43.

This is illustrated and expanded in FIG. 11, and in particular shows the following:

The phase between the disconnect switch drive to 66, waveform 210, and the main drive to 52, waveform 200, can be changed. This is seen from the differing delay times, 208, 206 and 204, between the turn off for switch 52 and the turn off for switch 66. The results of this can be seen on the relationship between the output voltage 260 and the voltage across the secondary of transformer 44 winding 50.

The energy initially, when the disconnect switch is on, is diverted to the capacitor 38, see 250 and the voltage change for 258, 254 and 256. The amount of energy sent to capacitor 38 is dependent upon the phase overlap periods. In the case of the waveshape 214 where there is no overlap period between the waveshapes 200 and 210, i.e. the falling edge of 214 for the 66 drive falls at the same time as the corresponding 52 pulse, there is no energy transferred to the capacitor 38.

Thus, we can see differing amounts of energy that can be transferred to the capacitor 38 on a continual basis and this becomes an independent power control, virtually independent of the amount of energy leaving the output or of the voltage required on the on capacitor 38. There are other advantages seen, in that the load current, 230, can have the initial normally noisy turn on continuous flyback converter waveshape changed, see waveshape 232 against the others, 236, 234 and 238.

There is no special impedance required in series with the output, see FIG. 12 which also shows a transformer coupled phase pulse switch drive and control for a N channel disconnect switch, 75 and 76.

The short duration pulses required are compatible with transformer 77 coupling to the disconnect switch 66 whereas DC coupling to the switch is difficult to achieve.

The turn on for the disconnect switch 66 is prior the turn off for the main drive 52 and so has zero loss. The turn off for the disconnect switch is also low loss, changing from the clamped voltage on capacitor 38 to the reflected voltage on the output, which is not significant (maybe 50 V maximum). See waveforms 276 and 274.

While the present invention has been particularly described with respect to the illustrated embodiments, it will be appreciated that various alterations, modification and adaptations may be made based on the present disclosure, and are intended to be within the scope of the present invention. While the invention has been described in connection with what is presently considered to be the most practical and preferred embodiments, it is to be understood that the present invention is not limited to the disclosed embodiments but, on the contrary, is intended to cover various modifications and equivalent arrangements included within the scope of the appended claims.

What is claimed is:

1. A line harmonic correcting power converter with single stage DC to DC conversion, comprising:

first and second AC input terminals;

b) a rectifier circuit arranged to convert an AC voltage applied to said AC input terminals to unsmoothed DC and to apply the same to a DC input having a positive and a negative terminal;

c) a first capacitor connected across said DC input in series with a first diode;

d) a transformer connected to said DC input, said transformer including:

i) a primary winding connected across said DC input in series with a first switch;

ii) first and second secondary windings;

iii) said second secondary winding being connected to a rectifying and filtering circuit including a second diode and a second capacitor, said circuit being arranged to convert the current induced in said second secondary winding into smooth DC;

e) a pulse generator arranged to turn said first switch on and off at high frequency; and f) a second switch, said first secondary winding being connected in series with said second switch between one of said terminals of said DC input and the junction between said first capacitor and said first diode;

wherein said first secondary winding is configured to recharge said first capacitor.

2. The converter of claim 1, further comprising:

a second pulse generator arranged to turn said second switch on and off.

3. The converter of claim 2, in which said second pulse generator is arranged to turn said second switch off whenever the instantaneous voltage of said DC input drops below a predetermined level.

4. The converter of claim 2, wherein said second pulse generator is arranged to modulate said second switch with a period that is an integer multiple of the cycle time of said first pulse generator, the modulation of said second pulse generator selected so that energy flows to said rectifying and filtering circuit on at least a portion of one cycle and to said first capacitor on at least a portion of another cycle during each said period.

5. The converter of claim 4, wherein said second switch is modulated in alternate cycles.

6. The converter of claim 2, in which said second pulse generator is driven in synchronizism with said first pulse generator but is additionally arranged to turn said second switch off when the instantaneous voltage of said DC input drops below a predetermined value.

7. The converter of claim 2, in which said rectifying and filtering circuit includes a synchronous rectifier, said synchronous rectifier being driven in phase with said second pulse generator.

8. The converter of claim 7, in which said second pulse generator is driven in synchronism with said first pulse generator.

9. The converter of claim 7, in which said synchronous rectifier is driven through a second transformer.

10. The converter of claim 2, wherein said second pulse generator is configured to modulate said second switch with a phase relative to said first switch selected to regulate the energy coupled to said first capacitor.

11. A line harmonic correcting power converter with single stage DC to DC conversion, comprising:
   a) first and second AC input terminals;
   b) a rectifier circuit arranged to convert an AC voltage applied to said AC input terminals to unsmoothed DC and to apply the same to a DC input having a positive and a negative terminal;
   c) a bulk capacitor connected across said DC input in series with a first diode;
   d) a transformer connected to said DC input, said transformer including:
      i) a primary winding connected across said DC input in series with a first switch;
      ii) a clamp winding; and
      iii) a secondary winding connected to a rectifying and filtering circuit said filtering circuit being arranged to convert the current induced in said second secondary winding into smooth DC; and
   e) a second diode connected in series with said clamp winding, the output of said second diode being coupled to the junction between said bulk capacitor and said first diode;
   f) a second switch coupled to regulate the flow of current of said clamp winding; and
   g) wherein said clamp winding, said second switch, and said second diode are arranged to recharge said bulk capacitor.

12. The converter of claim 11, in which said second switch is a P-channel device coupling said clamp capacitor to said negative terminal of said DC input.

13. A line harmonic correcting power converter with single stage DC to DC conversion, comprising:
   a) first and second AC input terminals;
   b) a rectifier circuit arranged to convert an AC voltage applied to said AC input terminals to unsmoothed DC and to apply the same to a DC input having a positive and a negative terminal;
   c) a bulk capacitor connected across said DC input in series with a first diode;
   d) a transformer connected to said DC input, said transformer including:
      i) a primary winding connected across said DC input in series with a first switch;
      ii) a clamp winding; and
      iii) a secondary winding connected to a rectifying and filtering circuit said filtering circuit being arranged to convert the current induced in said second secondary winding into smooth DC; and
   e) a second diode connected in series with said clamp winding, the output of said second diode being coupled to the junction between said bulk capacitor and said first diode;
   f) a second switch coupled to regulate the current flow of said clamp winding; and
   g) a clamp capacitor connected between said negative terminal of said DC input and to a node between said clamp winding and said second diode.

14. The converter of claim 13, in which said second switch is an N-channel device.

15. A line harmonic correcting power converter with single stage DC to DC conversion, comprising:
   a) first and second AC input terminals;
   b) a rectifier circuit arranged to convert an AC voltage applied to said AC input terminals to unsmoothed DC and to apply the same to a DC input having a positive and a negative terminal;
   c) a first capacitor connected across said DC input in series with a first diode;
   d) a transformer connected to said DC input, said transformer including:
      i) a primary winding connected across said DC input in series with a first switch;
      ii) first and second secondary windings;
      iii) said second secondary winding being connected to a rectifying and filtering circuit including a second diode and a second capacitor, said circuit being arranged to convert the current induced in said second secondary winding into smooth DC;
   e) a pulse generator arranged to turn said first switch on and off at high frequency;
   f) a second switch, said first secondary winding being connected in series with said second switch between one of said terminals of said DC input and the junction between said first capacitor and said first diode; and
   g) a second pulse generator arranged to turn said second switch on and off; wherein said second pulse generator is arranged to operate in synchronism with said first pulse generator so as to operate as a clamp drive for zero voltage switching.

16. A line harmonic correcting power converter with single stage DC to DC conversion, comprising:
   a) first and second AC input terminals;
   b) a rectifier circuit arranged to convert an AC voltage applied to said AC input terminals to unsmoothed DC and to apply the same to a DC input having a positive and a negative terminal;
   c) a bulk capacitor connected across said DC input in series with a first diode;
   d) a transformer connected to said DC input, said transformer including:
      i) a primary winding connected across said DC input in series with a first switch;
      ii) a clamp winding; and
      iii) a secondary winding connected to a rectifying and filtering circuit said filtering circuit being arranged to convert the current induced in said second secondary winding into smooth DC; and
   e) a second diode connected in series with said clamp winding, the output of said second diode being coupled to the junction between said bulk capacitor and said first diode;
   f) a second switch coupled to regulate the flow of current of said clamp winding; and
   wherein said clamp winding, said second switch, and second diode are arrange to recharge said bulk capacitor.

* * * * *